(12) United States Patent
Batcheller et al.

(10) Patent No.: US 10,821,460 B2
(45) Date of Patent: Nov. 3, 2020

(54) INNOVATIVE SPRAYING SYSTEM

(71) Applicant: INTELLIGENT AGRICULTURAL SOLUTIONS LLC, Fargo, ND (US)

(72) Inventors: David C. Batcheller, Fargo, ND (US); Barry D. Batcheller, West Fargo, ND (US); Marshall T. Bremer, Fargo, ND (US); Bradley R. Thurow, Fargo, ND (US); Nicholas L. Butts, West Fargo, ND (US); Jeffrey L. Johnson, West Fargo, ND (US); Paul A. Nystuen, West Fargo, ND (US); Joseph A. Heilman, Fargo, ND (US); Robert J. Volesky, West Fargo, ND (US); Jonathan L. Tolstedt, Seattle, WA (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 268 days.

(21) Appl. No.: 15/557,444

(22) PCT Filed: Mar. 9, 2016

(86) PCT No.: PCT/US2016/021563
§ 371 (c)(1),
(2) Date: Sep. 11, 2017

(87) PCT Pub. No.: WO2016/145081
PCT Pub. Date: Sep. 15, 2016

(65) Prior Publication Data
US 2018/0111148 A1    Apr. 26, 2018

Related U.S. Application Data

(60) Provisional application No. 62/130,056, filed on Mar. 9, 2015.

(51) Int. Cl.
*B05B 12/02* (2006.01)
*A01M 7/00* (2006.01)
(Continued)

(52) U.S. Cl.
CPC .......... *B05B 12/02* (2013.01); *A01C 23/042* (2013.01); *A01C 23/047* (2013.01);
(Continued)

(58) Field of Classification Search
CPC  B05B 12/12; B05B 15/65; B05B 1/20; B05B 12/122; B05B 12/1472;
(Continued)

(56) References Cited

U.S. PATENT DOCUMENTS

| 4,398,605 A |   | 8/1983 | Conklin et al. |
| 5,606,821 A | * | 3/1997 | Sadjadi .............. A01M 7/0089 |
|             |   |        | 47/1.01 R |

(Continued)

FOREIGN PATENT DOCUMENTS

| CN | 102435019 | 5/2012 |
| GB | 990346    | 4/1965 |

OTHER PUBLICATIONS

"International Search Report and Written Opinion", PCT/US2016/021563, dated Aug. 8, 2016.

*Primary Examiner* — Tuongminh N Pham

(57) ABSTRACT

An innovative spraying system, comprising features such as a weather station that senses environmental factors that may affect spraying operations, a system for creating and distributing droplets of a uniform and appropriate size, a flow management system that would allow the sprayer to control nozzle rate and direction individually, a high-rate flow system capable of filling the sprayer at rates of up to at least 400 gallons per minute, a modular chemical cartridge system, in which various chemicals are stored in pre-loaded, (Continued)

easy to install cartridges, a direct injection system, mixing chemicals and water as needed, optionally based on sensed changing conditions, electrostatic application of chemical to optimize the amount of chemical applied to plant matter.

17 Claims, 9 Drawing Sheets

(51) Int. Cl.
*B05B 1/20* (2006.01)
*B05B 12/14* (2006.01)
*B05B 13/00* (2006.01)
*B05B 12/12* (2006.01)
*B05B 15/65* (2018.01)
*A01C 23/04* (2006.01)
*A01M 21/04* (2006.01)

(52) U.S. Cl.
CPC ........ *A01M 7/0042* (2013.01); *A01M 7/0085* (2013.01); *A01M 7/0089* (2013.01); *A01M 7/0092* (2013.01); *A01M 21/043* (2013.01); *B05B 1/20* (2013.01); *B05B 12/12* (2013.01); *B05B 12/122* (2013.01); *B05B 12/1418* (2013.01); *B05B 12/1472* (2013.01); *B05B 13/005* (2013.01); *B05B 15/65* (2018.02)

(58) Field of Classification Search
CPC ... B05B 13/005; B05B 7/0408; B05B 7/0884; A01C 23/042; A01C 23/047; A01M 7/0042; A01M 7/0085; A01M 7/0089; A01M 21/043; A01M 7/0092
See application file for complete search history.

(56) References Cited

U.S. PATENT DOCUMENTS

| | | | |
|---|---|---|---|
| 5,653,389 A * | 8/1997 | Henderson | A01M 7/0089 239/172 |
| 5,809,440 A * | 9/1998 | Beck | G06F 12/0684 47/1.7 |
| 6,012,996 A | 1/2000 | Lo | |
| 6,065,686 A * | 5/2000 | Betts-Williams | A01M 7/0089 222/617 |
| 6,533,334 B1 | 3/2003 | Bonn | |
| 2008/0110476 A1 | 5/2008 | Amestoy et al. | |
| 2009/0005731 A1* | 1/2009 | Yokoyama | A61B 17/00491 604/83 |
| 2009/0114210 A1 | 5/2009 | Guice et al. | |
| 2009/0192654 A1* | 7/2009 | Wendte | A01B 79/005 700/283 |
| 2013/0233940 A1* | 9/2013 | Ballu | B05B 7/32 239/102.2 |
| 2014/0180549 A1* | 6/2014 | Siemens | A01B 39/18 701/50 |
| 2014/0263705 A1* | 9/2014 | Michael | A01G 25/16 239/10 |
| 2014/0303814 A1* | 10/2014 | Burema | A01B 79/005 701/3 |

* cited by examiner

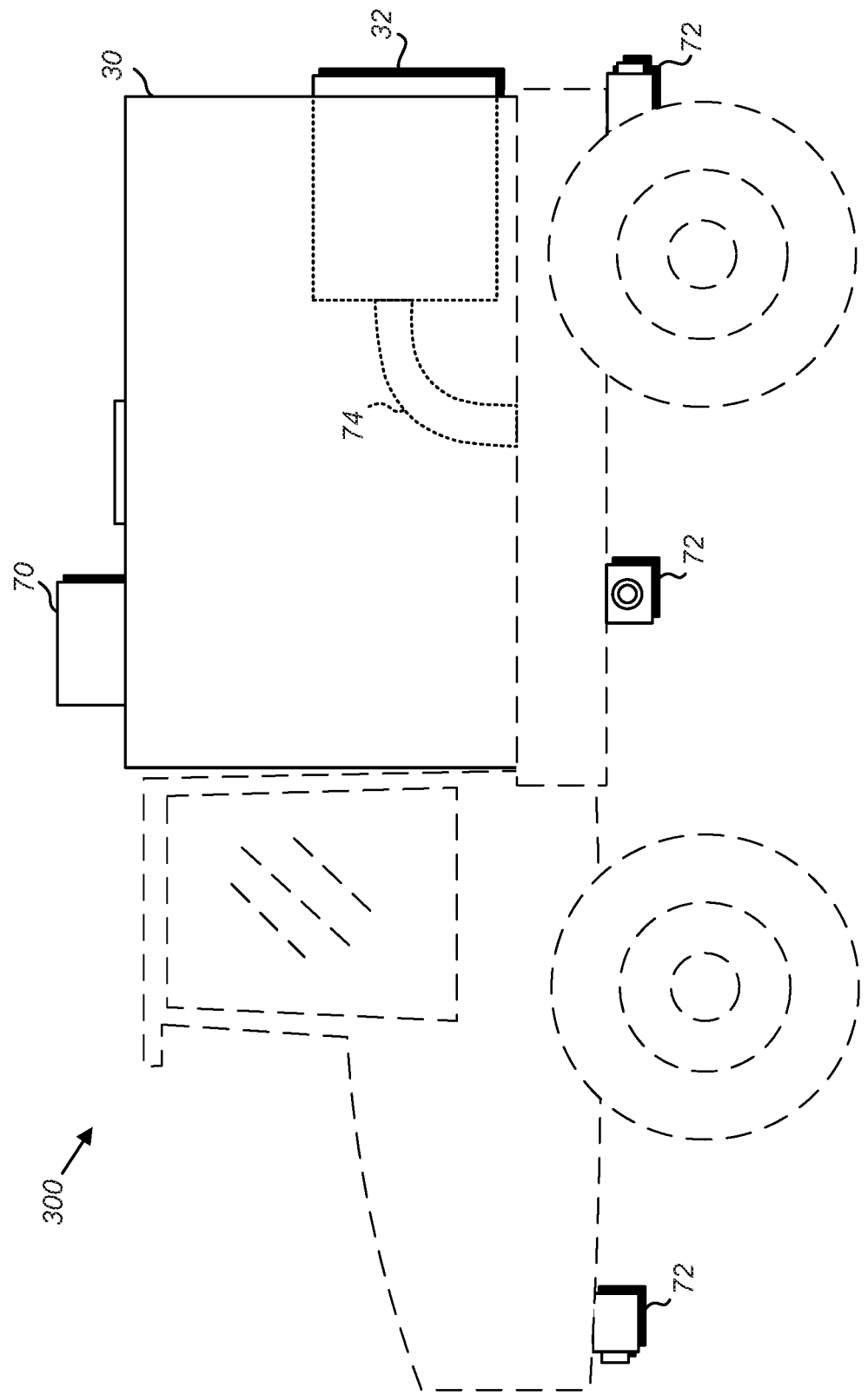

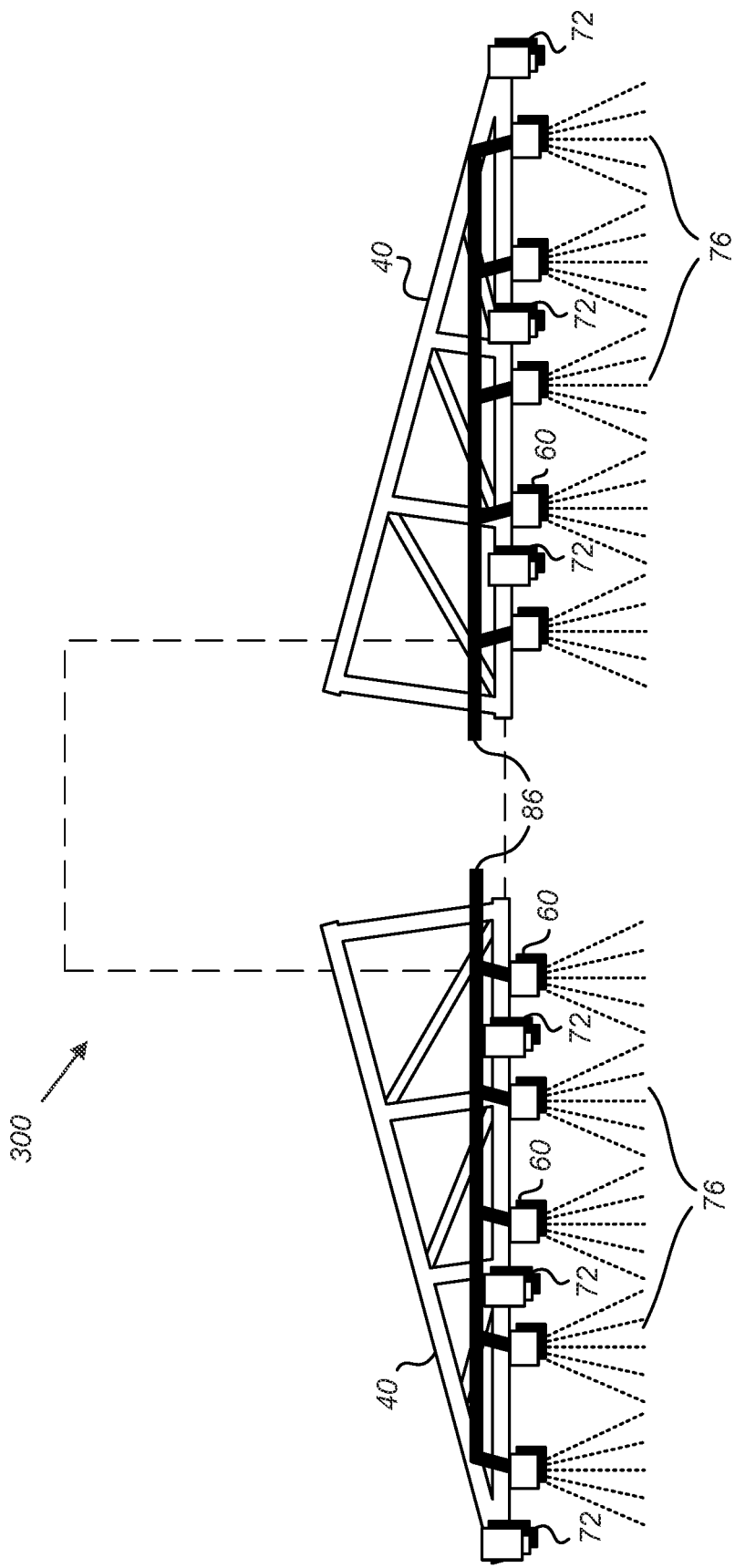

INNOVATIVE SPRAYING SYSTEM

CROSS-REFERENCE TO RELATED APPLICATIONS

This application is a national stage filing for International Patent Application No. PCT/US2016/021563, filed Mar. 9, 2016, which claims priority in U.S. Provisional Patent Application No. 62/130,056, filed Mar. 9, 2015, both of which are incorporated herein by reference.

FIELD OF INVENTION

This invention relates to the field of agricultural chemical application, and specifically to an innovative chemical spraying system.

BACKGROUND

Agricultural spraying systems have been around for years and have changed little in their design or function. Although the use of Global Positioning System (GPS) satellites and other Global Navigation Satellite Systems (GNSS) has enabled features like yield mapping (where the amount of crop harvested from specific areas of a field can be saved in a map) which can help a spraying system determine where to place chemicals for future applications, there are still many technical issues to overcome in chemical spraying. Weather can have a huge effect on a chemical spraying system. Wind can cause chemicals like fertilizer or pesticides to drift onto a neighboring patch of land, missing the intended target and potentially causing damage where the chemicals finally deposit. The relative humidity can affect how readily plants will absorb chemicals.

Other factors affect the efficiency of spraying. The size and uniformity of the droplets created and deposited by the spray can have a significant effect on the effectiveness of the application, and different chemicals may require different size droplets in order to achieve maximum effectivity. The difficulties of applying sprays at night limits productivity, even though some studies show that night-time spraying can be more effective.

What is needed in the art is a system and method for optimizing the spray application of chemicals that can take into account environmental factors such as weather and time of day, that can increase the accuracy and efficiency of chemical placement and eliminate or reduce drift, and which simplifies the overall process of chemical spraying.

SUMMARY OF THE INVENTION

According to one aspect of the present invention, an innovative spraying system, comprising in at least one embodiment:
- A weather station that senses air temperature above and near the ground, relative humidity, wind speed, and various other weather and environmental factors.
- A system for creating and distributing droplets of a relatively uniform and appropriate size.
- A flow management system that would allow the sprayer to:
  Vary rate by nozzle.
  Shut off and control individual nozzles.
  Operate at field speeds of up to at least 30 mph.
- A high-rate flow system capable of filling the sprayer at rates of up to at least 400 gallons per minute.
- A modular chemical cartridge system, in which various chemicals are stored in pre-loaded, easy to install cartridges, and for which a corresponding control system and software application is used for optimizing flow rate calculations, recording available chemical quantity, mixing chemicals in the proper quantities automatically, and other related functions.
- A direct injection system, mixing chemicals and water as needed, optionally based on sensed changing conditions.
- Electrostatic application of chemical to optimize the amount of chemical applied to plant matter as opposed to wasted on bare soil.
- A look ahead plant identification camera to pick out "suspicious" foliage (foliage belonging to known weed or pest plant types) and alerting the operator with sufficient notice to make a rate and/or chemical change.
- Enabling night-time operations utilizing a near infrared (NIR) vision system, a synthetic vision system, or similar night vision means.

It would be obvious to one skilled in the arts that individual subsystems of such a sprayer are in and of themselves inventions, and that various embodiments of an innovative sprayer may be created that use subsets and combinations of the listed features above, or by adding other functions not captured herein.

This aspect and others are achieved by the present invention, which is described in detail in the following specification and accompanying drawings which form a part hereof.

BRIEF DESCRIPTION OF DRAWINGS

FIG. 1A is an illustration representing an innovative spraying vehicle of the present invention.

FIG. 1B is an illustration showing sprayer booms for an innovative spraying vehicle of the present invention.

DETAILED DESCRIPTION OF THE PREFERRED EMBODIMENT

Figure 1C:
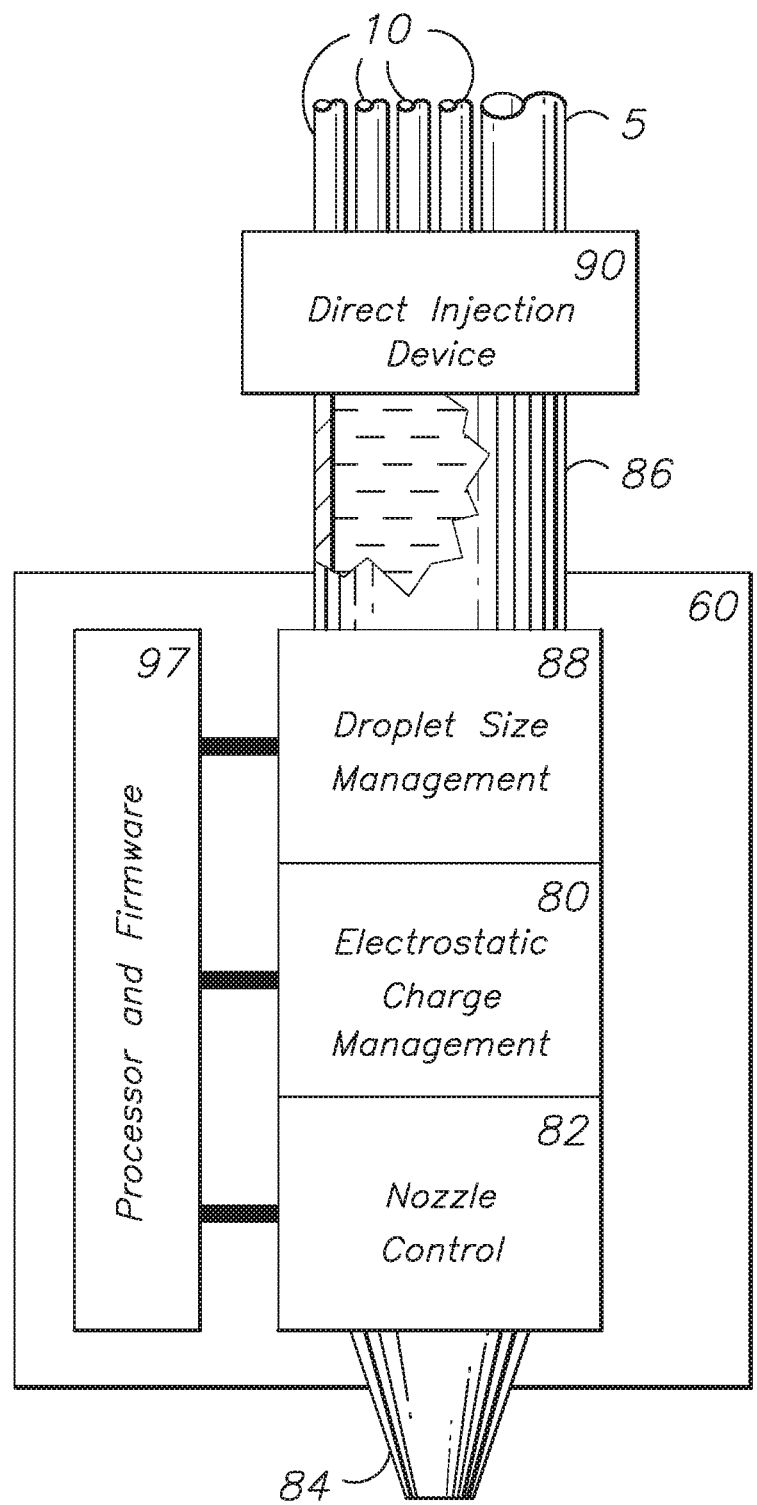
FIG. 1C is a functional block diagram of a spray management system of the present invention.

With reference now to the drawings, and in particular to FIGS. 1A through 6 thereof, a new system and method for chemical spraying is described. The examples presented herein show a self-propelled, agricultural spraying vehicle. However, these examples are not meant to be limiting. The invention described herein may be applied to other, non-agricultural applications. In additions, spraying systems that are not self-propelled may also utilize some or all aspects of the present invention.

A typical self-propelled, agricultural spraying machine in the prior art is a piece of equipment that is used to apply chemicals, such as herbicides, pesticides, and fertilizers, on agricultural crops. Sprayers are typically self-propelled units similar to tractors, with long booms extending to either side of the vehicle, holding hoses and nozzles suspended above the crop or field to be sprayed. Typical boom lengths range from 60 to 150 feet in length, but other lengths are possible. Prior art spraying systems are relatively simple, with little control over how the spray is applied.

Turning now to the figures, we will describe an innovative spraying system and method of its use. FIG. 1A is an illustration representing an innovative spraying vehicle 300 of the present invention. FIG. 1B is an illustration showing sprayer booms 40 for an innovative spraying vehicle 300 of the present invention. These two figures should be taken together, with FIG. 1A showing primarily the vehicle itself, minus the spraying booms, as well as the elements of the invention most associated with the vehicle, and FIG. 1B focusing on the booms and the elements of the invention most associated with the booms. The booms are shown separate from the vehicle only for clarity.

Looking at FIG. 1A, we see the main body of a spraying vehicle 300. The spraying vehicle 300 has a main tank 30 for holding water and/or chemicals to be sprayed. The spraying vehicle 300 also has several chemical cartridges 32 which can be pushed into special locations on the spraying vehicle 300 (not shown in FIG. 1A, but discussed in FIG. 5). In FIG. 1A, and in later figures, the chemical cartridges are shown fitting into special slots built into the main tank 30, however, the cartridges 32 may be held in any other appropriate location on the spraying vehicle 300. The cartridges 32 hold chemicals that can be transported to other parts of the spraying vehicle 300 via transport conduits 74, potentially to be mixed at another location on the spraying vehicle 300 before the mixture is sprayed onto a crop, an area of land, or another target (such as the delivery of chemical to de-ice the wing of an aircraft or an icy sidewalk).

Other optional features on the spraying vehicle 300 of the present invention may include a weather station 70 and a number of imaging devices 72. The weather station 70 senses environmental factors such as air temperature above and near the ground, relative humidity, wind speed, and various other weather and environmental factors. The information sensed by the weather station 70 may be used as an input into the spray management system of the spraying vehicle 300 (not shown here but discussed in later figures), allowing the spraying vehicle 300 to compensate for these factors by adjusting spraying parameters such as the spray pattern, spray direction, droplet size, and the electrostatic charge of the droplets. For example, if the weather station 70 detects a strong wind from the west, the spraying vehicle 300 can command changes to the spraying parameters to adjust for the wind and eliminate drift and increase the effectiveness of the spraying. The spraying vehicle could also use information from the weather station 70 to provide warnings to the operator of the vehicle, alerting them to conditions such as temperature inversions (when there is a layer of colder air trapped beneath a warmer layer of air, trapping spray particles and allowing them to drift off course), approaching rain, and dangerous storms.

The imaging devices 72 may be still image cameras, video recording devices, infrared or near infrared (NIR) cameras, night vision sensors, or any other appropriate type of sensor that would allow image data to be captured and used. The imaging devices 72 may be placed around the spraying vehicle 300 and used to aid the operator in operating under adverse conditions, including night time operation. These imaging devices 72 may be used to create a virtual display for the operator, giving them visual data and augmented reality images that meet or exceed daytime viewing conditions.

The imaging devices 72 may also be used to "look ahead" and identify foliage out ahead of the vehicle 300 so that the spraying vehicle 300 can determine proper amounts and types of chemical mixtures to have ready for the area as it approaches.

Turning to FIG. 1B, while keeping FIG. 1A in mind, we focus on the boom system of the spraying vehicle 300. FIG. 1B shows two booms 40, which would typically be mounted on either side of the spraying vehicle 300. In FIG. 1B, the body of the spraying vehicle 300 shown in FIG. 1A is represented as a dashed box to show the approximate relationship of the booms 40 to the main vehicle body 300.

The booms 40 hold one or more spray management devices 60, which are fed mixtures of chemicals and/or water through a series of conduits 86 which deliver chemicals and/or water from the main tank 30 or the chemical cartridges 32. The chemicals and/or water maybe premixed when they arrive at the spray management devices 60, or they may be mixed as needed just before the point of spray (see FIG. 1C), perhaps even inside the spray management devices 60 themselves (see FIG. 1D).

The spray management devices 60 will determine the proper amount of mixed liquid 76 to emit and how the liquid 76 will be emitted (amount, direction, droplet size, etc.). The term "mixed liquid" as used herein shall mean whatever the final liquid composition is to be deposited on the targeted area, and could include and not be limited to a single liquid (including pure water but more likely a chemical agent), a homogeneous mixture, a chemical composition, and a mixture of liquid and solid components (such as fertilizer granules).

The booms 40 may also hold a number of imaging devices 72, such as those described in the description corresponding to FIG. 1A above. These imaging devices 72 as deployed on the booms 40 may help provide visual or optical data on the condition and position of the booms 40, the amount and pattern of the mixed liquid 76, blocked nozzles, plant matter, amount of liquid 76 on the plant matter, and obstacles such as rocks, terrain anomalies, animals, and people.

FIG. 1C is a functional block diagram of one embodiment of a spray management system 60 from FIG. 1B. Conduits containing water 5 and other chemicals 10 feed into a direct injection device 90. The purpose of the direct injection device 90 is to determine the proper ratio of chemicals 10 and water 5 for the current application, conditions, and commanded requirements, and to mix the appropriate amounts of each chemical 10 and water 5 as needed at any given time. The chemical conduits 10 may be attached to the chemical cartridges 32 of FIG. 1A, with each conduit 10 containing a relatively pure form of a single chemical taken from one of the cartridges 32. In alternate embodiments of the present invention, the conduits 10 may connect to other types of chemical holding tanks or receptacles.

The water conduit 5 may be connected to the main tank 30 of FIG. 1A, and supply water to the direct injection device 90 for mixing. It should be noted that any appropriate number of chemical conduits 10 and water conduits 5 may be used without deviating from the present invention, and that either type of conduit 5 or 10 may carry any type of liquid, liquid mixture, or liquid/solid mixture. The figures and discussion herein are meant to be exemplary and not limiting in any way.

The direct injection device 90 contains a processor and firmware (not shown) that allow the direct injection device 90 to determine the proper ratio of chemicals 10 and water 5 for the current application. The direct injection device 90 may receive inputs from various on-board systems and sensors (such as the weather station 70 of FIG. 1A) or it may receive directives from a separate subsystem that collects the required information and operator commands to determine what the liquid mixture should be. The direct injection device 90 then operates separate valves releasing chemicals 10 and water 5 in controlled quantities to achieve the commanded liquid mixture for spraying.

Once the correct liquid mixture is created, it flows out of the direct injection device 90 through a conduit 86 into the spray management system 60. Several optional functions take place inside the spray management system 60. One such function is droplet size management 88. Studies have shown that the size and the uniformity of the droplets of liquid mixture can affect the effectivity of the chemical being applied. Certain chemicals are more readily absorbed by certain plants if the droplet size is above or below certain predefined thresholds. This can vary from plant type to plant type, with the type of chemical being sprayed, and with the environmental conditions. For example, a relatively high humidity level (as might be sensed using a weather station 70 as shown in FIG. 1A) may reduce the ability of some plants to absorb liquid chemical.

Uniformity of droplet size is also important. If a quantity of droplets of liquid is sprayed on a plant, but only 40% of the droplets are of a diameter that will be properly absorbed by the plant, the maximum effectiveness is 40%. Different sizes of droplets will behave differently in varying environmental conditions, as well. Droplets under a certain size and mass may drift on the wind longer and not be deposited on the targeted location.

Control of droplet size may be done by a number of possible technologies. A droplet "cutting" system could be used, where the position and speed of a rotating or reciprocating blade as it pass through a relatively continuous stream of liquid to produce properly-sized droplets. Using an ultrasonic nozzle and varying the frequency of the ultrasonic mechanism can affect droplet size. Using an artificial cross breeze to cause smaller (less massive) droplets to be pushed out of the main stream and collected on the side of the conduit or tube to be recycled for use on another pass can produce droplets above a specified diameter. If the droplets are charged, an electric field can be used in a fashion similar to the breeze to select droplets based on their mass and inertia.

An electrostatic charge management function 80 may also be used to improve the effectiveness of a spraying application. As the droplets are created to form the spray, they can be exposed simultaneously to an electrostatic field, thus creating either a negative or positive charge on the spray droplets. Droplets with non-neutral charges are attracted to any oppositely charged, polarizable, or conductive components in plant matter, making coverage more uniform and drift less likely. When all of the droplets in the emitted spray have the same charge, for example a cloud of particles all with a positive charge, the like charges will repulse each other and keep the droplets from coalescing and forming larger droplets and keep them spread out in a uniform distribution.

A nozzle control function 82 may be included to direct or "steer" the stream of particles in one direction or the other, or to focus the stream into a narrower stream, or to widen the stream to better distribute the particles. This could be done by moving the nozzle 84 one direction or another, changing the shape of the nozzle 84, or using compressed air or another method of pushing and shaping the stream of droplets as it leaves the nozzle 84.

The spray management system 60 may also contain a processor with firmware 97 as a means of controlling the spray functions described above. The processor and firmware 97 may receive commands from a separate subsystem and simply carry out the required operations, or it may directly receive inputs such as environmental conditions (weather), crop type and maturity, soil type, etc., and determine the proper adjustments to make to the spray management system 60.

FIG. 1D is a functional block diagram of an alternate embodiment of a spray management system of the present invention. The embodiment shown in FIG. 1D is identical to the embodiment of FIG. 1C, except that the direct injection device 90 is incorporated into the spray management system 60 instead of being external to it. Both embodiments are functionally identical, and so the functional description above for FIG. 1C is applicable for FIG. 1D.

FIG. 2 is a perspective view of a transport tube or conduit designed to carry multiple types of liquid in a single, integrated pathway. A multi-channel conduit 100 is designed to have at least one primary channel 5 and at least one secondary channel 10. Please note that the reference designators for the primary channel 5 and secondary channels 10 are identical to the conduits used for water 5 and chemicals 10 in FIGS. 1C and 1D. This overlap is intentional, as the water conduit 5 in FIGS. 1C and 1D could be the primary channel 5 of FIG. 2 and the chemical conduits 10 of FIGS. 1C and 1D could be the secondary channels 10 of FIG. 2.

However, the secondary channels 10 of FIG. 2 are formed or mounted inside the primary channel 5. Perhaps one way to understand the inventive concept of FIG. 2 is to start by imagining the secondary channels 10 as smaller diameter tubes threaded down the inside of the larger diameter tube of the primary channel 5. The secondary channels 10 could be adhered to the inner wall of the primary channel 5, or they may actually be molded or extruded as part of the primary channel 5, as shown in FIG. 2. The dashed lines 10*a* running the length of the segment of the multi-channel conduit 100 are hidden lines showing that the secondary channels 10 run the length of the primary channel 5. The example multi-channel conduit 100 shown in FIG. 2 would be capable of carrying five different liquid types, one type in the primary channel 5 and one other type in each of the four secondary channels 10. Any appropriate number of secondary channels 10 could be made in the multi-channel conduit 100.

An optional set of longitudinal notches 8 may be designed into the multi-channel conduit 100. In the example embodiment shown, the notches 8 run the length of the multi-channel conduit segment 100 shown, but they could also be placed periodically along the conduit 100 or created as needed. The purpose of the notches 8 is to define where the secondary channels 10 are located (since they would not be visible from the outside of conduit 100), and to provide a location for a nozzle mechanism or "tap" to be pushed into the conduit 100 so that any of the liquids stored within either the secondary channels 10 or the primary channel 5 may be sampled.

Small openings 12 into each of the secondary channels 10 and the primary channel 5 may be placed at any appropriate place along the conduit 100 to allow sampling of the liquids. This sampling concept is detailed in FIGS. 3 and 4.

Figure 2:
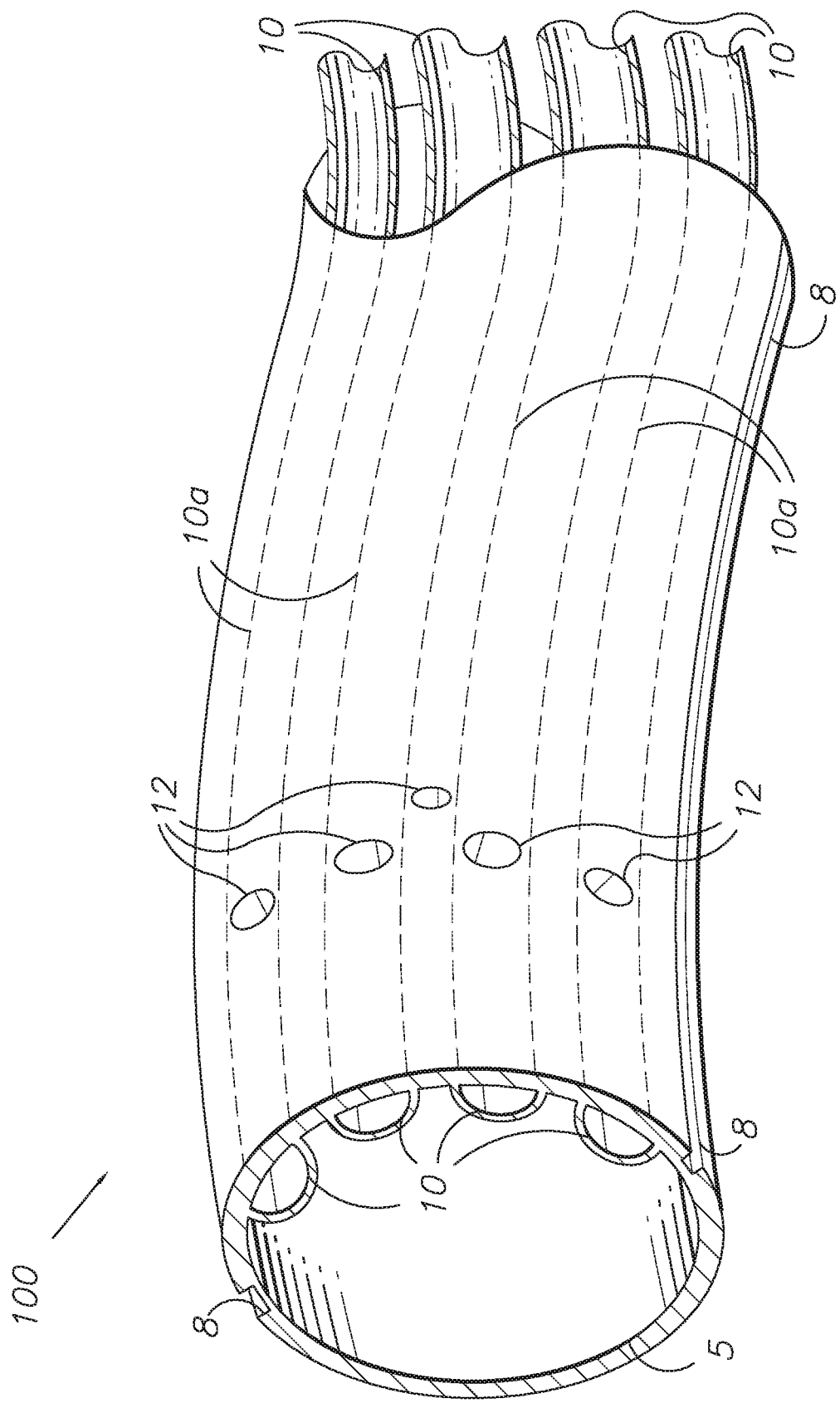
FIG. 2 is a perspective view of a transport tube designed to carry water and other liquids (such as chemicals) in a single, integrated conduit.
Figure 3:
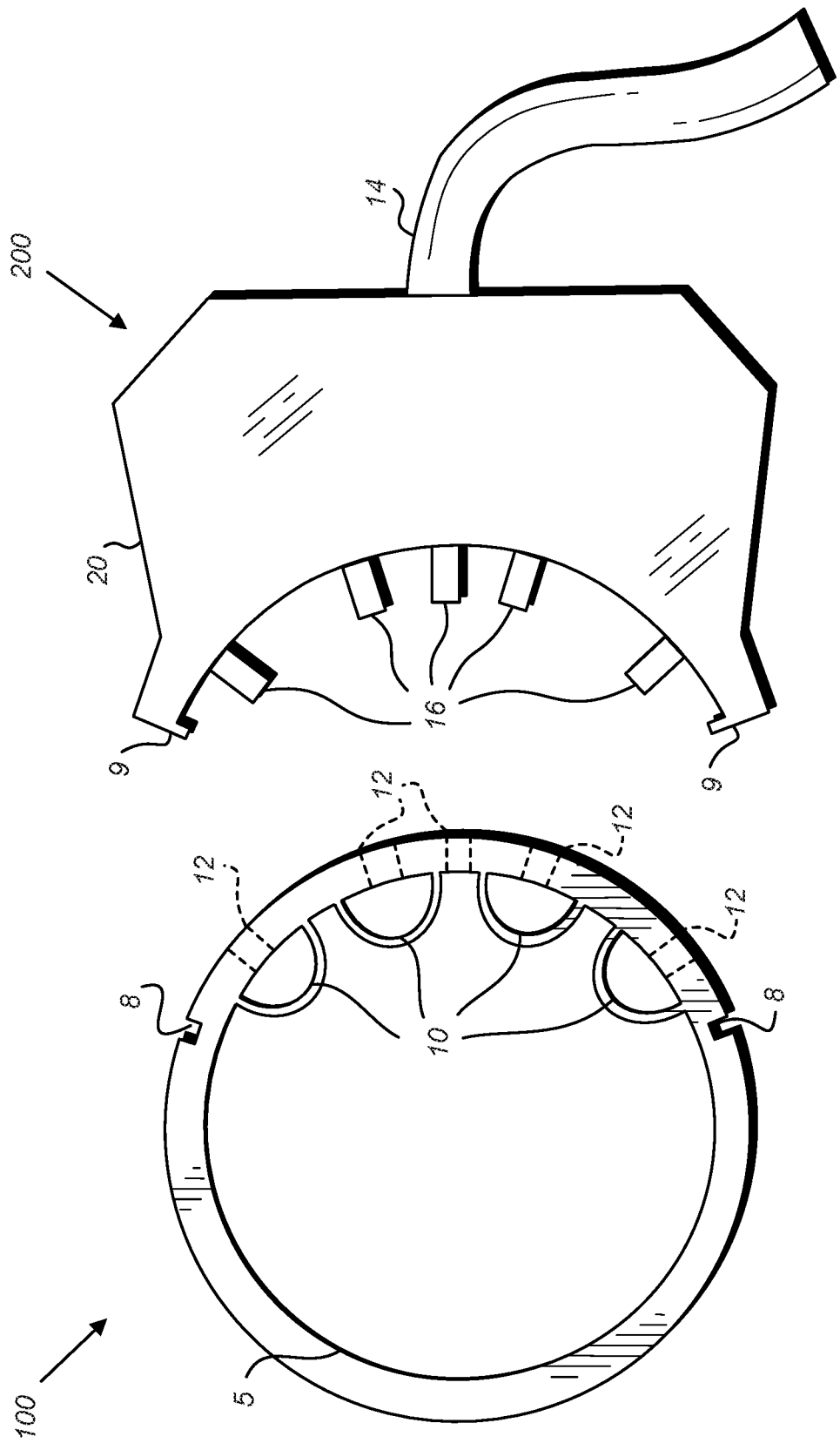
FIG. 3 shows a cross-sectional view of the transport tube of FIG. 2 and a nozzle attachment that snaps onto the transport tube for the purpose of extracting chemicals and water as needed.

FIG. 3 shows a cross-sectional view of the multi-channel tube 100 of FIG. 2 and a nozzle attachment 200 that snaps onto the multi-channel conduit 100 for the purpose of extracting chemicals and water as needed. The nozzle attachment 200 can be thought of as a series of "taps" that can pierce the wall of the multi-channel conduit 100, with smaller diameter tap conduits 16 piercing the wall of the multi-channel conduit 100 such that the open end of each of the taps 16 is inside either the primary channel 5 or the secondary channels 10.

The nozzle attachment 200 is contained in a nozzle housing 20. The taps 16 are pushed into the multi-channel conduit 100 and liquids are syphoned or sucked out up into the nozzle housing 20 where they will be mixed in appropriate quantities to be delivered through an exit conduit 14 to the nozzle for spraying. Optional latches 9 will snap into notches 8 to provide correct alignment of the taps 16 with the secondary channels 10 and the primary channel 5.

Figure 4:
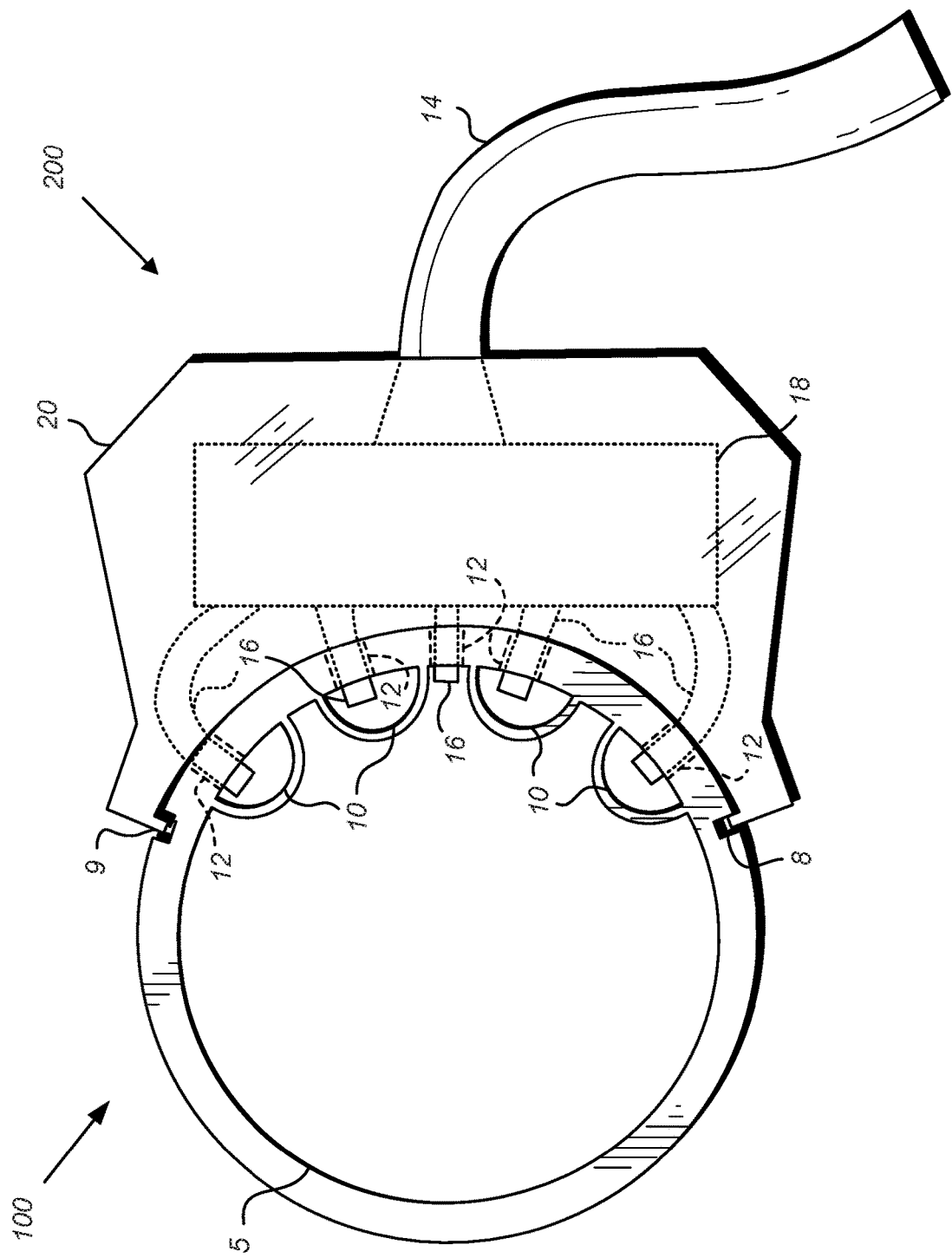
FIG. 4 shows an alternate cross-sectional view of the transport tube and nozzle attachment of FIG. 3, showing how the two pieces can be connected.

FIG. 4 shows an alternate cross-sectional view of the transport tube and nozzle attachment of FIG. 3, showing how the two pieces can be connected. Most of the description given for FIG. 3 is applicable to FIG. 4, except that the nozzle attachment 200 is now snapped onto the multi-channel conduit 100, and the tap conduits (taps) 16 are shown penetrating the outer wall of multi-channel conduit 100. It the example embodiment of FIG. 4, the taps 16 are shown arranged such that four of the taps 16 are positioned such that they sample from each of the four secondary channels 10 and the fifth tap 16 (the middle of the five taps 16 vertically) is shown positioned between two of the secondary channels 10 such that is samples from the primary channel 10. Dotted lines are used to show how the taps 16 pass through the outer wall of the multi-channel conduit 100. Latches 9 are shown snapped in place into notches 8 to hold the nozzle attachment 200 in place and properly aligned on the multi-channel conduit 100.

Dotted lines are also used to show the structure inside the nozzle housing 20, where the taps 16 enter into a central module, or mixing module, 18. The mixing module 18 may contain electronics and valve hardware such that it can determine how much of each liquid it will take from each of the secondary channels 10 and/or the primary channel 5. For example, if the mixing module 18 determines the spraying application/vehicle needs a solution that is 10% of Chemical A and 90% water, then the mixing module 18 will open the valve to the tap 16 that is positioned in the secondary channel 10 that contains Chemical A, as well as the tap 16 into the primary channel 5 containing water (in this example), and take in the two liquids in a ratio of 9 parts water and 1 part Chemical A. In other examples, the mixing module 18 may take liquids from any combination of secondary channels 10 and primary channel 5 to obtain the proper components in the proper ratio to create the appropriate mixture for spraying.

Once the sampled chemicals are mixed in the mixing module 18, the mixture is pumped or allowed to flow into an exit conduit 14, which may go to a spray nozzle for distribution on the plants in the field (or whatever appropriate target in other applications).

Figure 1D:
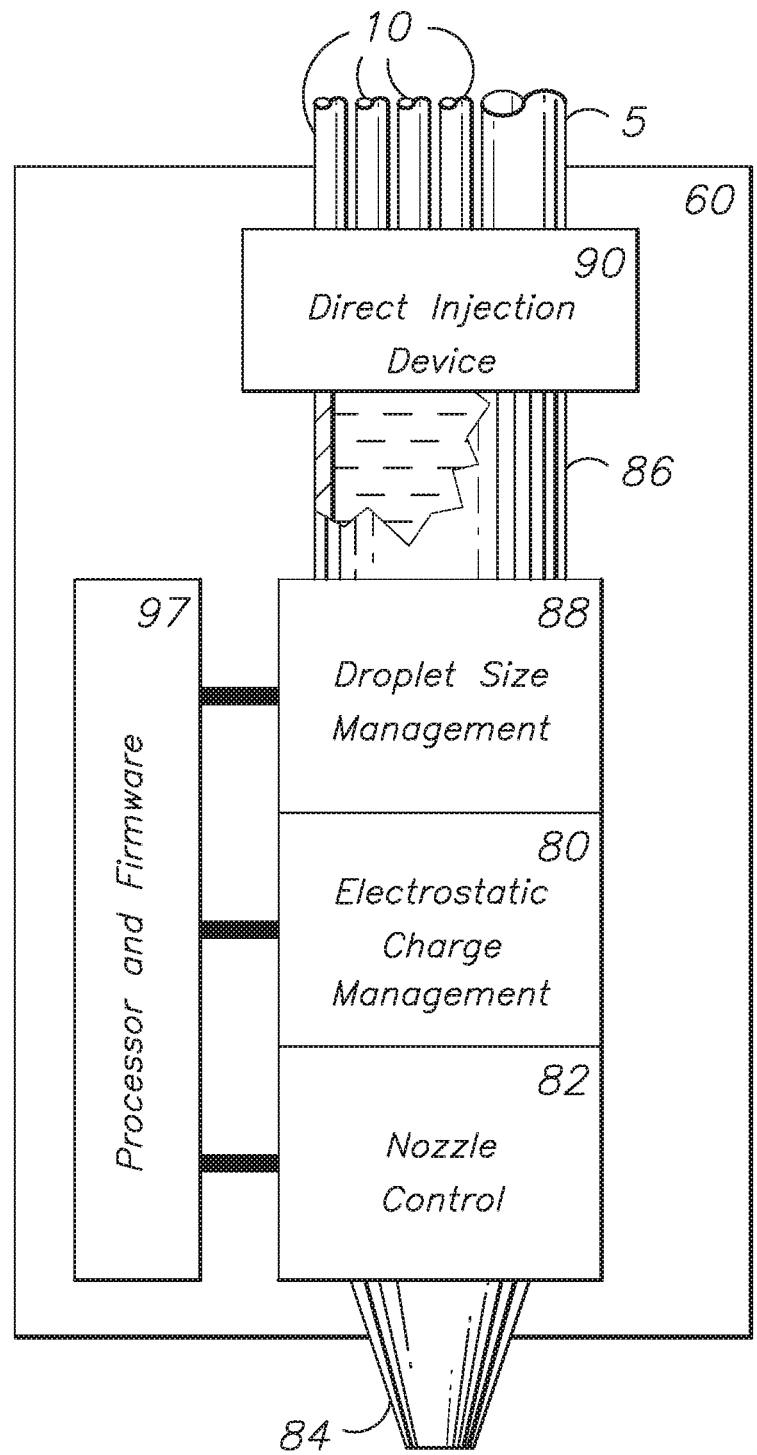
FIG. 1D is a functional block diagram of an alternate embodiment of a spray management system of the present invention.

It should be noted that the mixing module 18 of FIG. 4 is essentially the same as and functionally equivalent to the direct injection device 90 of FIGS. 1C and 1D, and that the exit conduit 14 of FIG. 4 is essentially the same as and functionally equivalent to the conduit 86 in FIGS. 1C and 1D.

Figure 5:
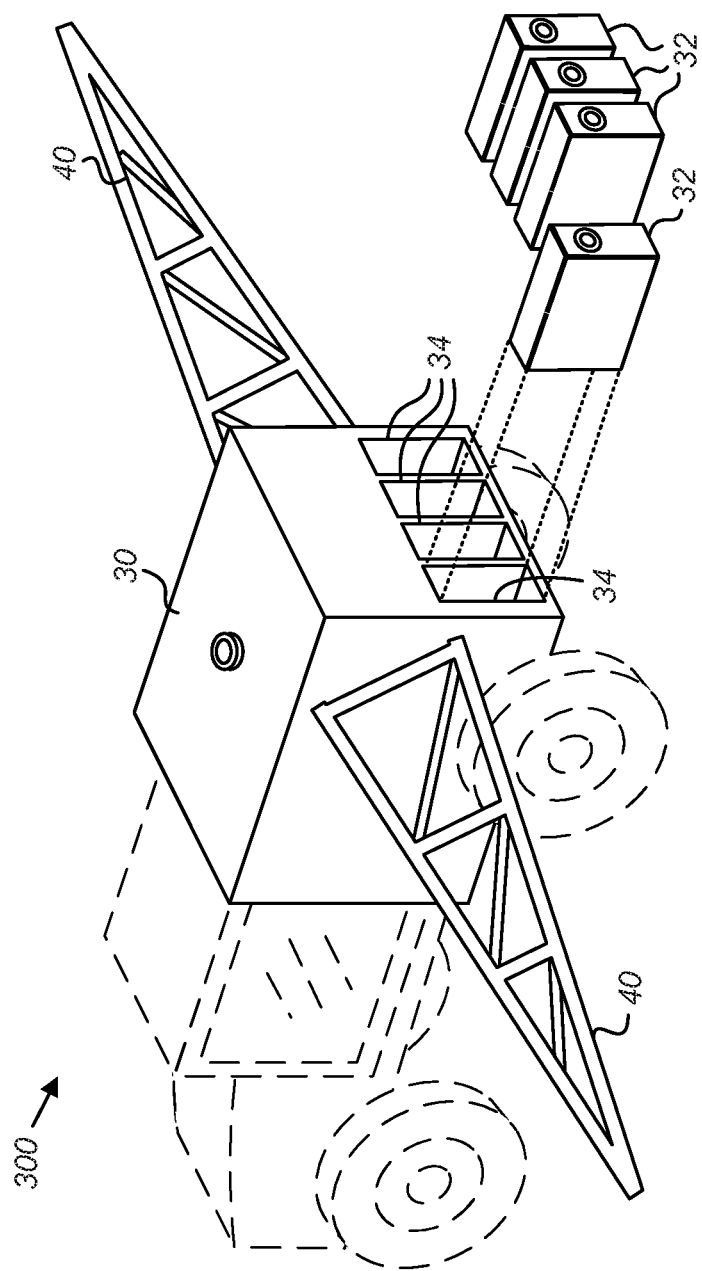
FIG. 5 is a perspective view of an innovative spraying vehicle of the present invention, showing a novel chemical cartridge invention.

FIG. 5 is a perspective view of an innovative spraying vehicle 300 of the present invention, showing a novel chemical cartridge invention, showing an alternative view to the vehicle 300 and booms 40 shown in FIGS. 1A and 1B. In FIG. 5, the spraying vehicle 300 has a main tank 30 for holding the primary mixing liquid, which is typically water, but which may be any other appropriate liquid. Other types of liquids can be loaded into the vehicle 300 in innovative chemical cartridges 32, which are inserted into cartridge receptacles 34. The receptacles 34 are shown as part of the main tank 30, but they may also be located on another part of the spraying vehicle 300. When the cartridges 32 are pushed into the receptacles 34, the chemicals contained in the cartridges 32 may be sampled by hoses or conduits similar to those shown in previous figures of this specification, such that they can be mixed in the proper ratios for spraying, as has been previously described in this specification.

It should be noted that the main tank 30 could also be implemented as a cartridge 32, and that the relative sizes of the main tank 30 and the cartridges 32 may vary dramatically from those shown in FIG. 5. The idea behind a cartridge loading system is to allow for a quick change of chemicals between sprayings, or to refill tanks with minimal downtime and increased productivity.

Figure 6:
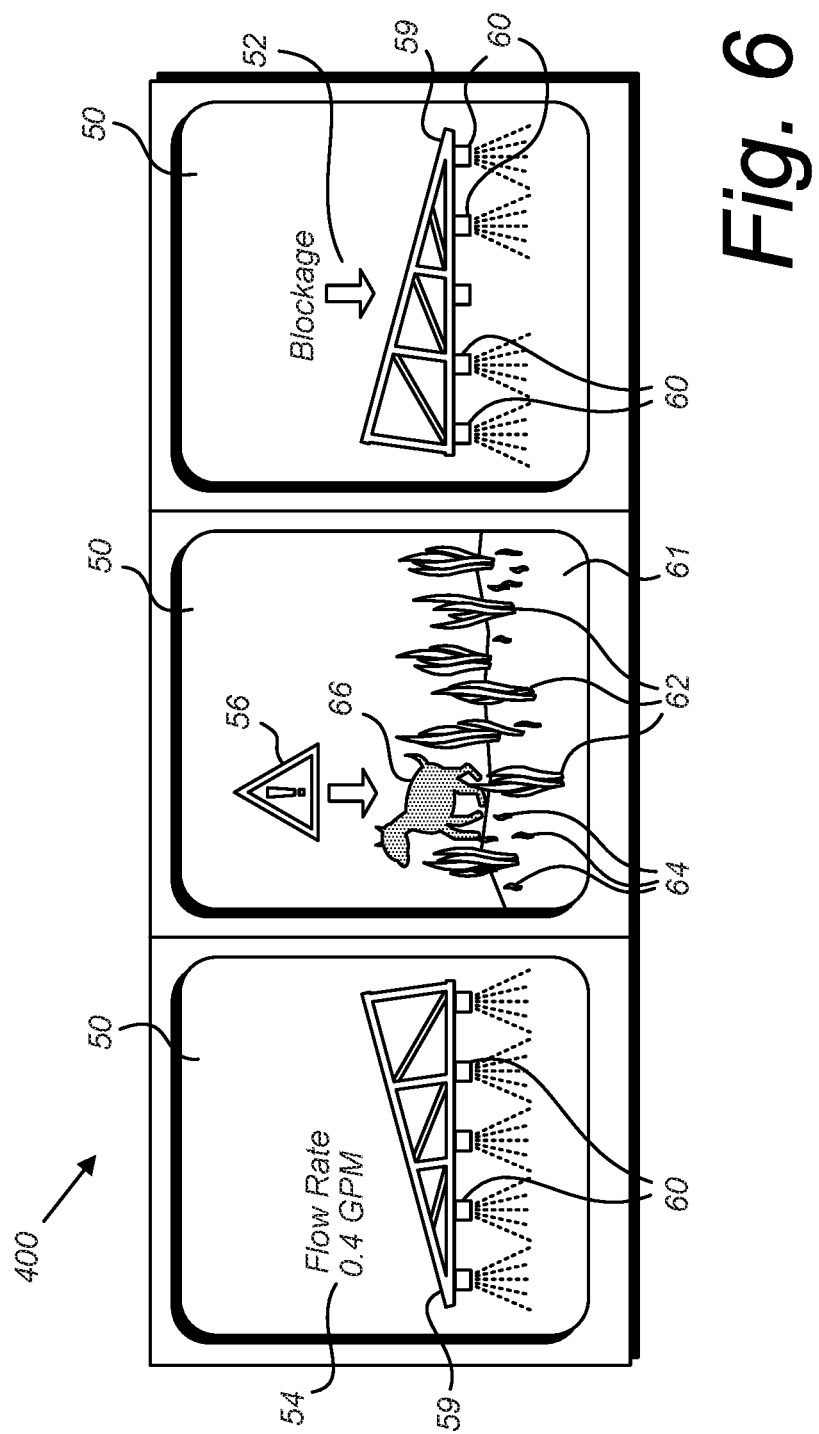
FIG. 6 shows one embodiment of a night-time vision system, allowing an innovative spraying vehicle to operate during night-time or reduced light conditions.

FIG. 6 shows one embodiment of a night-time vision system 400, allowing an innovative spraying vehicle to operate during night-time or reduced light conditions. Imaging devices 72 (as shown in FIGS. 1A and 1B) are distributed throughout the exterior of the spraying vehicle 300 and booms 40, as shown in FIGS. 1A and 1B. As previously explained, these imaging devices 72 may be near infrared (NIR) cameras or night vision devices that can capture images and/or video from outside the vehicle 300 and create a display for the operator that can give night-time viewing that allows 24-hour spraying operation.

The night-time vision system 400 comprises one or more displays 50. The displays 50 may be flat screen displays mounted inside the vehicle cab, the displays of handheld, mobile devices (such as a smart phone, an iPad, or similar mobile computing device), a heads-up display (HUD) integrated into or projected onto the windows of the vehicle cab, or any other appropriate means or method of displaying information.

Information shown on the displays 50 may include graphics or images of the booms 59 and graphics or images of the spray nozzles 60, images or graphics representing terrain 61, plants 62, and weeds 64, moving/transient objects such as animals 66, and system status information, such as warning icons 56, notifications of blockages 52, and flow rate information 66. The displays 50 can be designed to present any appropriate type of information, including vehicle information, text messages, internet pages, weather updates, etc.

The graphics and images shown on the displays 50 may be virtual recreations of real-world images, actual images received from the imaging devices 72, or other informational or graphical displays as required by the application. When NIR devices or night vision is used, the images captured can be processed for information to create augmented video or complete recreations of scenes, giving the operator the information necessary to work at night or in adverse visual conditions.

Having thus described the invention, what is claimed as new and desired to be secured by Letters Patent is:

1. A spraying management system configured for mounting on a vehicle, which spraying management system comprises:

an on-board spraying material reservoir:
a processor programmed for controlling a spraying management system operation;
a flow control subsystem connected to said reservoir;
said flow control subsystem including a sensor mounted on said vehicle and configured for sensing a spray material target;
a multi-channel spraying material discharge conduit connected to said flow control subsystem, wherein said multi-channel discharge conduit include a primary channel and a plurality of secondary channels, said primary channel of the multi-channel discharge conduit formed with a wall having inner and outer wall surfaces and said plurality of secondary channels located within the primary channel and integrated into the inner wall surface of the primary channel, wherein the outer wall surface of the multi-channel discharge conduit has at least one longitudinal locating marker that runs a length of the multi-channel discharge conduit, wherein the locating marker is configured to define where the secondary channels are located within the primary channel;
a spray nozzle boom mounted on said vehicle and configured for defining a spray pattern along a vehicle path of travel;
multiple spray nozzles mounted in spaced relation along said boom and connected to the multi-channel spraying material discharge conduit;
said flow control subsystem configured for selectively and individually controlling spraying material discharge characteristics from respective nozzles, said flow control subsystem being configured for mixing water from said primary channel and a plurality of chemicals from said plurality of secondary channels for discharge from said nozzles; and
said processor programmed f t controlling said nozzles based on input from said sensor whereby said spray material target receives spray according to at least one preprogrammed spray parameter.

2. The spraying management system according to claim 1, which includes:
said at least one spray parameter including one or more of: droplet size; spray material discharge rate; spray pattern; and spray target coverage.

3. The spraying management system according to claim 1, which includes:
said flow control subsystem including a weather-responsive function configured for creating and distributing droplets of relatively uniform and appropriate size and adapting said spraying management system in response to: air temperature above and near the ground, relative humidity and wind speed; and said processor being linked to a weather condition source.

4. The spraying management system according to claim 1, which includes:
a droplet size control subsystem configured for maintaining uniformity in droplet size.

5. The spraying management system according to claim 1, wherein said on-board spraying material reservoir comprises a modular chemical cartridge system configured for storing preloaded chemicals.

6. The spraying management system according to claim 1, which includes:
said processor being programmed for controlling the mixing of chemicals and water based on sensed conditions; and
said processor being programmed for optimizing an amount of chemicals applied to plant matter.

7. The spraying management system according to claim 1, which includes:
an imaging device connected to said processor and configured for one or more of: night vision; near-infrared (NIR); and synthetic vision capabilities.

8. The spraying management system according to claim 1, which includes:
an imaging device configured for creating a virtual display for an operator.

9. The spraying management system according to claim 1, which includes:
a look-ahead plant identification camera configured for detecting known weed and pest plant types and a function for alerting an operator to said detected plant types.

10. The spraying management system according to claim 1, which includes a night vision subsystem and optical sensing capabilities.

11. The spraying management system according to claim 5, which includes,
said modular chemical cartridge system including multiple spray cartridges; and
transport conduits connecting respective spray cartridges to respective mixing locations on said vehicle.

12. The spraying management system according to claim 1, which includes said spraying management system being configured for containing, transporting and spraying deicing chemicals to ice-covered spraying targets.

13. The spraying management system according to claim 1 wherein the longitudinal locating marker is a notch configured to define where the secondary channels are located within the primary channel.

14. The spraying management system according to claim 1 wherein the at least one longitudinal locating marker comprises a continuous marker that runs the length of the multi-channel discharge conduit.

15. The spraying management system according to claim 1 wherein the at least one longitudinal locating marker comprises periodic markers along a longitudinal line that runs the length of the multi-channel discharge conduit.

16. The spraying management system according to claim 1 wherein each of the multiple spray nozzles comprises a nozzle attachment configured to interface with the locating marker.

17. The spraying management system according to claim 16 wherein the nozzle attachment comprises a plurality of taps configured to extend through the wall of multi-channel discharge conduit, each of the taps forming a tap conduit leading to one of the primary channel or the secondary channels.

* * * * *